Oct. 31, 1961  J. M. HOLAHAN, JR  3,006,573
SPINNING REEL
Filed Dec. 10, 1957  3 Sheets-Sheet 1
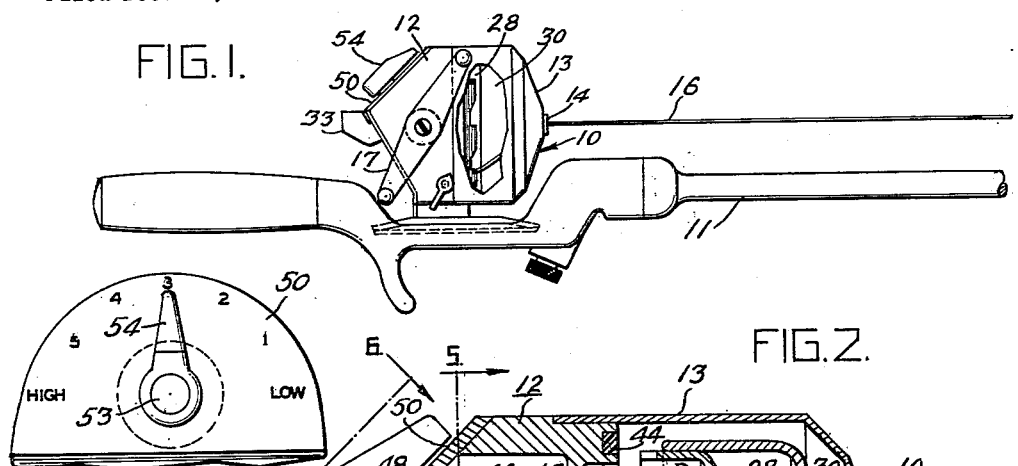
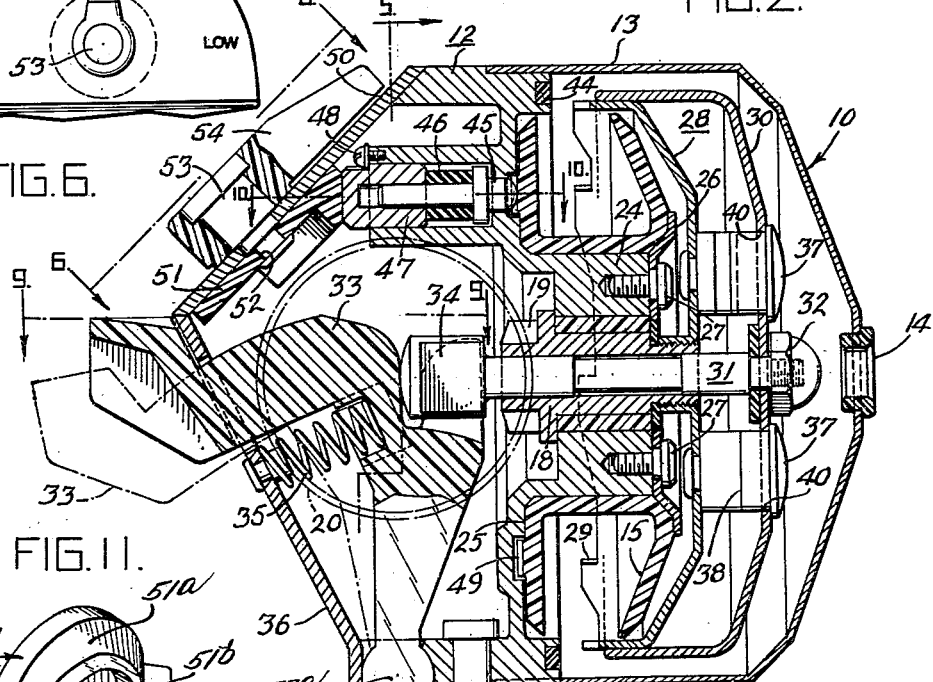
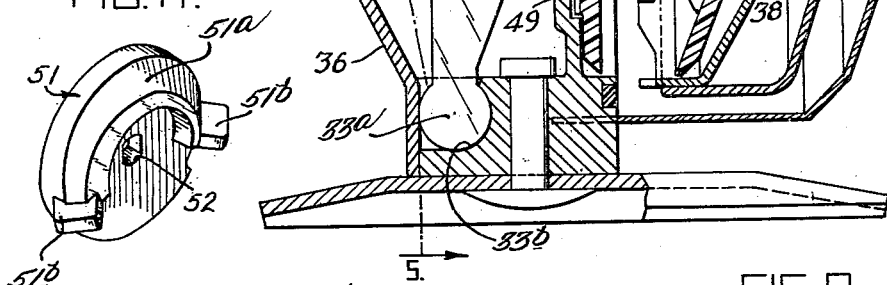
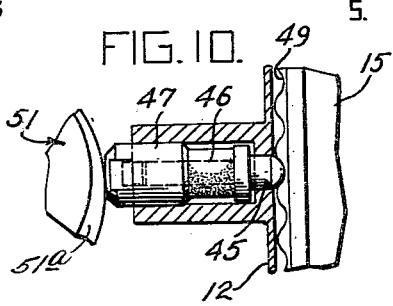
INVENTOR:
JOSEPH M. HOLAHAN JR.
BY
Howson & Howson
ATTYS.

Oct. 31, 1961 — J. M. HOLAHAN, JR — 3,006,573
SPINNING REEL
Filed Dec. 10, 1957 — 3 Sheets-Sheet 2
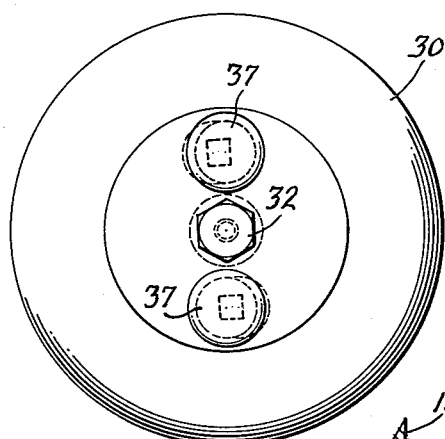
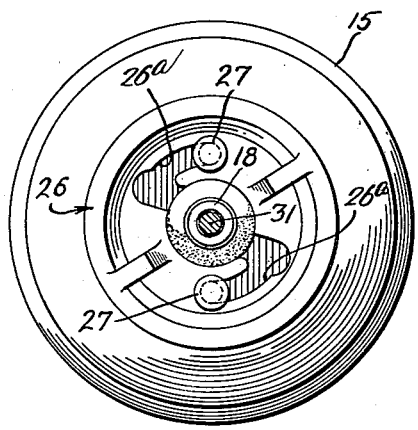
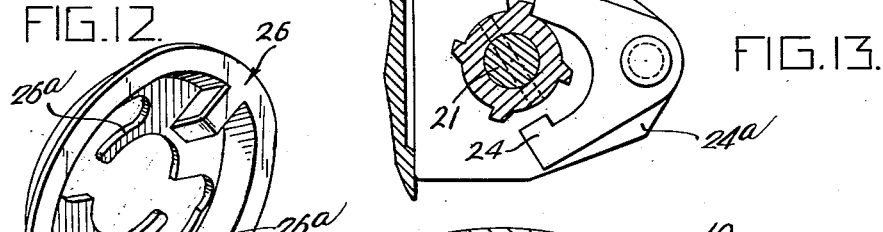
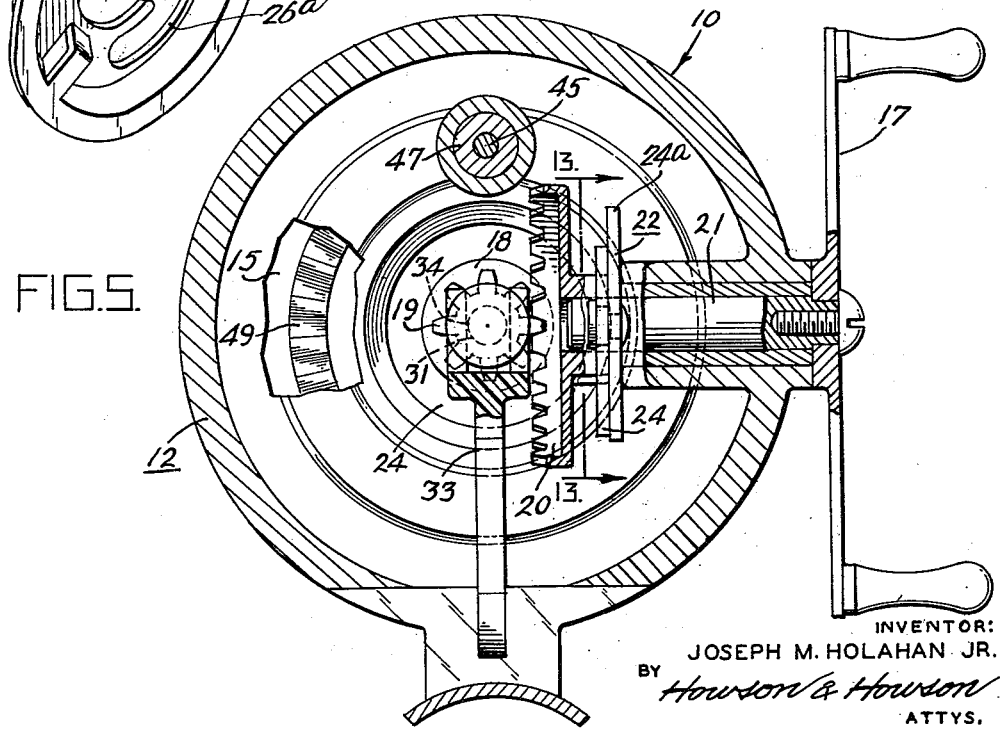
INVENTOR:
JOSEPH M. HOLAHAN JR.
BY Howson & Howson
ATTYS.

Oct. 31, 1961 J. M. HOLAHAN, JR 3,006,573
SPINNING REEL
Filed Dec. 10, 1957 3 Sheets-Sheet 3
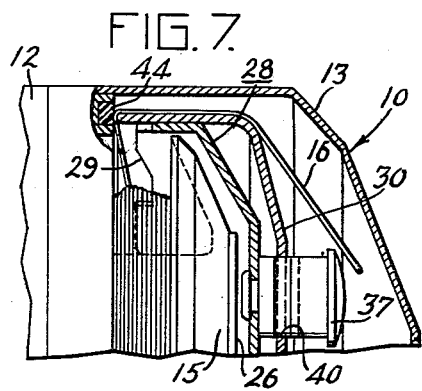
FIG. 7.
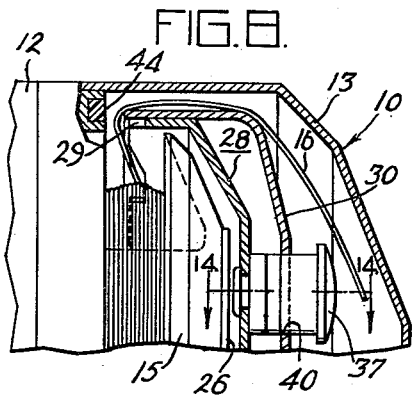
FIG. 8.
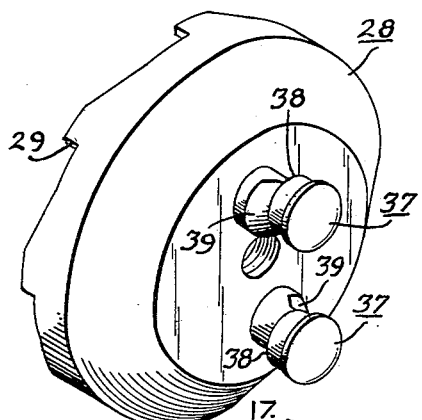
FIG. 15.
FIG. 14.
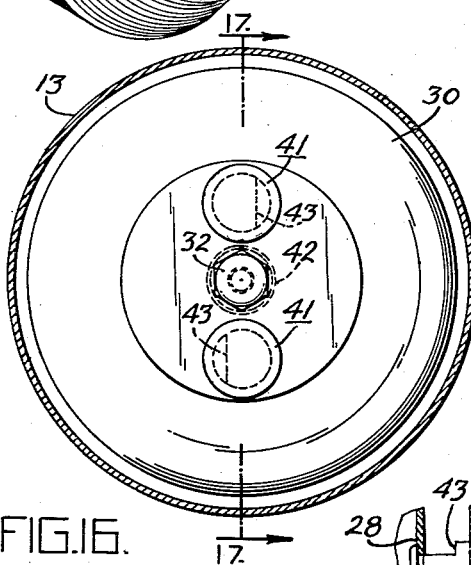
FIG. 16.
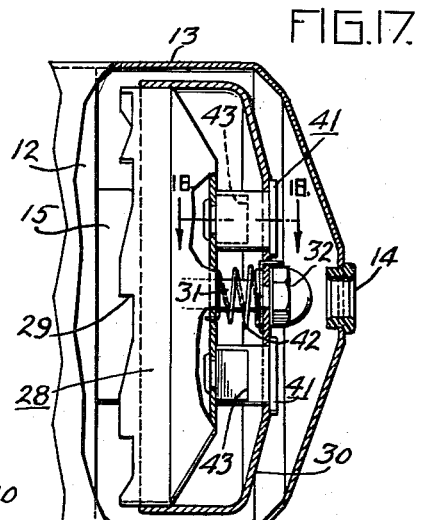
FIG. 17.
FIG. 18.
INVENTOR:
JOSEPH M. HOLAHAN JR.
BY Howson & Howson
ATTYS.

United States Patent Office 3,006,573
Patented Oct. 31, 1961

3,006,573
SPINNING REEL
Joseph M. Holahan, Jr., Abington, Pa., assignor to True Temper Corporation, a corporation of Ohio
Filed Dec. 10, 1957, Ser. No. 701,852
4 Claims. (Cl. 242—84.2)

The present invention relates to new and useful improvements in fishing reels and more specifically to novel improvements in spinning reels wherein the line is drawn off the spool in an axial direction during the casting operation.

Fishermen readily recognize the advantages of a reel of the above type, having a spool from which the line peels off during casting with relatively little resistance over the usual fishing reel having a rotating spool on which the line is coiled and in casting the spool rotates to pay out the line. The advantages of this reel include the ability to cast more accurately to long distances due to the decreased friction factor and elimination of the most common drawback in a fishing reel, backlash.

Spinning reels of this type had been previously known but heretofore such reels have been very complex and in some instances reliable operation during casting was not always assured. The pick-up device of prior spinning reels of this type comprised an arm or similar probing unit rotatable relative to the spool and operable to cause winding of the line on the spool. Fouling of the line in the above mentioned device while casting has been the source of much difficulty together with inadequate and complicated braking mechanisms for controlling the line during casting and while playing the fish.

The present invention provides essentially a spinning reel having a cup member disposed coaxially of the spool and adapted to be moved longitudinally thereof between an outer position wherein line pick-up mechanism is exposed to the line for effecting engagement and pick-up of the line, and an inner position wherein the cup is moved axially with respect to the line pick-up mechanism and telescopes over the same to permit release or unwinding of the line. The line pick-up mechanism, upon actuation of a control device regulated by the user is adapted to be telescoped within the outer cup member to permit free release of the line, and is adapted upon rotary movement of the handle, to be uncovered by the outer cup member and function as a positive pick-up for the line. Since the line uncoils from the spool about a smooth pay-off edge during casting, the likelihood of loops, kinks or snarls is eliminated and likewise when the line is reeved about the spool no pronounced wear on the line is encountered and the life of the line is thereby increased.

The elements set forth above are embodied in a relatively simple device wherein operation of the reel can be effected with one hand by even an unskilled fisherman. In addition the spool is housed in the reel in a manner to permit the user to substitute one spool for another with a minimum of delay. Thus the fisherman can have a variety of different weight lines that can readily be substituted for one another depending on the fishing conditions.

Another feature of the present invention includes dual drag devices, one of which controls the line during casting and consists preferably of an annular ring of rubber or other suitable friction material, mounted circumferentially on the front portion of the housing. The outer cup member may be placed in pressure applying relation with said annular ring to thereby snub the line and control the outflow of the line during casting. The other drag device is mainly adapted for controlling the drag on the line while playing the fish and is conveniently disposed so that drag can be readily adjusted to suit the requirements of a particular situation. The unique assembly set forth in the present reel comprises a drag pin which can be moved into various degrees of pressure applying relation with a surface of the spool to exert the desired degree of drag on the spool.

With the foregoing in mind the principal object of the present invention is to provide a novel spinning reel having a novel casting and retrieving mechanism which can be actuated to a line casting position by operation of a control bar conveniently disposed on the reel and to a line rewinding position by rotary movement of the winding handle.

Another object of the present invention is to provide a novel spinning reel having a new and useful line snubbing device which the user can actuate to a position to apply a retarding force on the line by selective positioning of a control lever operable by the hand holding the rod to thereby control the trajectory of the lure during casting.

A further object of the present invention is to provide a spinning reel having a novel and useful drag control mechanism whereby the user may control the amount of drag exerted on the spool of the reel while playing a fish.

A still further object of the present invention is to provide a novel spinning reel which may be manufactured easily and economically and can efficiently and effectively be adapted to various types of fishing.

These and other objects of the present invention and the various features and details of the operation and construction thereof are hereinafter more fully set forth and described with reference to the accompanying drawings in which:

FIG. 1 is an elevation of a reel made in accordance with the present invention in position on a fishing rod;

FIG. 2 is an enlarged longitudinal sectional view of the reel of the present invention;

FIG. 3 is a front elevational view of the outer cup showing the cam pins;

FIG. 4 is a front elevational view partially in section of the spool for the reel of the present invention;

FIG. 5 is a transverse sectional view on line 5—5 of FIG. 2;

FIG. 6 is a view of the dial plate assembly as viewed from line 6—6 of FIG. 2;

FIG. 7 is an enlarged fragmentary section showing the line being snubbed between the outer cup and the line clamp ring;

FIG. 8 is a sectional view similar to FIG. 7 showing the position of the cup members for releasing the line from the spool during casting;

FIG. 9 is a fragmentary plan view of the casting control bar interconnected with the rear portion of the line clamp shaft as viewed along line 9—9 of FIG. 2;

FIG. 10 is a sectional view on line 10—10 of FIG. 2 showing the drag pin assembly;

FIG. 11 is a perspective view of the cam plate for actuating the drag pin;

FIG. 12 is a perspective view of the spool retainer;

FIG. 13 is a fragmentary sectional view on line 13—13 of FIG. 5 exhibiting the anti-reverse mechanism;

FIG. 14 is a section view on 14—14 of FIG. 8 portraying the outer cup retracting pin;

FIG. 15 is a perspective view of the inner cup assembly;

FIG. 16 is a front elevational view of another embodiment of a cam pin assembly;

FIG. 17 is a section view on 17—17 of FIG. 16; and

FIG. 18 is a section view on line 18—18 of FIG. 17 showing the outer cup retracting pin of the embodiment of FIGS. 16 and 17.

Referring more specifically to the drawings and particularly FIG. 1 thereof, reference numeral 10 designates generally a spinning reel made in accordance with the present invention mounted on a rod 11. The spinning reel 10 comprises a supporting frame 12 having a conical shaped shroud member 13 removably secured to the front portion thereof, which terminates at its apex in a line guide eyelet 14. A spool 15 carrying the line 16 is mounted at the forward portion of the supporting frame, and a handle member 17 protruding from the side of the reel is adapted to cause the line to be wound about the spool.

A tubular centrally located drive shaft 18 is journaled in the bearing section of the housing and has a pinion 19 on its inner end which suitably intermeshes with a conventional crown drive gear 20 formed integrally on the inner end of a handle shaft 21. Since the handle shaft 21 extends transversely of the drive shaft 18 the gears are suitably mated gears which can intermesh and operate at right angles to one another, so that rotary movement of the handle 17 mounted on the outer end of the handle shaft imparts a corresponding rotary motion to the drive shaft 18. An anti-reverse assembly 22 is mounted coaxially with the drive gear and rearward thereof and may consist, as shown in the present embodiment of a ratchet wheel 23 fixed to the handle shaft and a dual pronged pawl 24 pivotally mounted adjacent the handle shaft on a mounting plate 24a projecting from the supporting frame. The function of the anti-reverse assembly 22 is to permit one way rotation of the winding handle 17. Thus when the handle is rotated in the clockwise direction which is the direction for causing the line to be wound on to the spool, the teeth of the ratchet wheel move unrestrained within the pawl member 24. Conversely when the handle 17 is rotated in the counterclockwise direction the front face of one of the teeth of the ratchet 23 abuts one prong of the pawl member and restrains further rotation of the ratchet wheel 23 and motion of the shaft 17 is impeded.

A central hub member 25a of generally cylindrical shape is formed integrally with the supporting frame 12 coaxially of the drive shaft 18 and mounts the spool so that the spool 15 is normally maintained stationary, but may be rotated against a predetermined drag as more fully described hereinafter.

A spool retainer member removably mounted on the front face of the hub (formed for example as shown in FIG. 12) is adapted to inhibit axial movement of the spool with respect to the hub 25a. To this end the outer periphery of the retainer member overlaps the outer edge of the hub so that the spool 15 is retained intermediate said overlapping flange in engagement with the spool and an annular portion 25 circumscribing the hub abutting the rear flange of the spool 15. The spool retainer member may be a washer-like element 26 having bayonet slots 26a, 26a diametrically spaced apart on the face of the washer adapted to engage over the heads of screws 27 mounted on the front wall of the hub and lock by annularly shifting the washer 26 with respect to the screws. Thus the line wrapped about the spool 15 can be paid off over the front flange of the spool thru an eyelet at the apex of the shroud 13.

In accordance with the present invention means are provided to wrap line about the spool and also to permit free casting of the line. To this end a line pick-up mechanism is provided wherein the line can be wound on to the spool upon relative rotation of the pick-up member with respect to the spool when the pick-up member is exposed to the line. Further a cover member is adapted to permit free casting of the line when the cover member is exposed to the line. In the present embodiment the line pick-up member may be a cup assembly 28 secured to the outer end of the pinion shaft 18. The cup 28 has a flat face portion near its center surrounded by a conical tapered segment which terminates in a cylindrical rearwardly extending flange portion. The circumferential edge of the flange portion is provided with means to engage and wrap line about the spool, and as shown in FIG. 17, the edge may be serrated as indicated at 29 or otherwise suitably provided with means to engage the line. It is desirable that the serrated edge 29 be free from imperfections that might serve to cut or fray the line, since the line travels over one of the serrations as it is wound on to the spool 15. The cup 28 is threadedly connected to the outer end of the pinion shaft 18 so that actuation of the handle causes rotary movement of the shaft 15 and a corresponding rotary movement of the cup 28.

The cover member may also be a cup assembly 30 similar in configuration to the line pick-up cup 28 and is mounted on the outer end of a line clamp shaft 31 slidably mounted in the drive staft. The cover cup 30 is adapted to be actuated axially of the inner cup 28 to thereby telescope over said inner cup and permit the line to be unwound about its outer circumferential edge. Accordingly the cup 30 has a flat face portion and a conical portion extending therefrom which terminates in a rearwardly extending cylindrical portion that has a smooth circumferential feeding edge. As with the inner cup it is expedient that the feeding edge be smooth and free from any burrs or other imperfections since the line travels over this edge as it pays out from the spool and, as explained later, is also snubbed by a clamping action between the circumferential edge of the outer cup and an annular surface on the supporting frame 12. The outer cup 30 is rotatably mounted on the outer end of the line clamp shaft 31 by means of a nut member 32.

Further, means are provided to move the line clamp shaft 31 longitudinally of the drive shaft 18 and to normally maintain said shaft 31 in an outward position. Accordingly a cast control bar 33 may be interconnected with the inner end of the line clamp shaft. As shown in FIG. 9 the shaft 31 has an enlarged head portion 34, undercut as indicated at 34a and the control bar has a yoke portion 34b formed thereon within which the head portion 34 of the shaft is received. The control bar 33 may be pivotally mounted as shown in FIG. 2 for example, by means of a rounded head portion 33a formed integrally with the control bar received in a recess 33b in the supporting frame and may be normally urged to a forward position by means of a spiral expansion spring 35 which may be mounted intermediate the control bar and a lower plate assembly 36 secured to the rear edge of the supporting frame. Thus movement of the control bar 33 rearwardly as shown in FIG. 2 effects longitudinal movement of the control bar shaft 31 with respect to the drive shaft 18, which in turn causes axial movement of the outer cup 30 with respect to the inner cup 28. In said position the inner cup 28 is telescoped within the outer cup 30 and the line is in a position to be payed out from the spool 15.

Another important feature of the present invention is the provision of means for maintaining the cup members in a line casting position and also for effecting actuation of the cups to a line pick-up position. To this end at least one cam pin is provided interconnecting the inner and outer cup. In the present embodiment, with reference to FIG. 2, a pair of cam pins 37, 37 are mounted on the front face of the inner cup 28 extending outwardly therefrom toward the outer cup. The pins may be fastened to the cup by means of a riveted joint and are preferably diametrically spaced apart. The cam pins 37 are substantially cylindrical having an offset portion as indicated at 38 forming a shoulder on one side and a tapered portion as indicated at 39 on the opposite side located midway of the pins as shown in FIG. 14. Suitable openings 40 are provided in the outer cup 30 to receive said pins and are preferably slightly larger than the diameter of the pin. Thus with reference to FIG. 2 when the control bar 33 is depressed to position shown in broken lines the outer cup 30 moves inwardly and is displaced angularly by contacting the taper on the pins 37. Upon release of the control bar 33 the outer cup 30 will be maintained in the position shown in FIG. 8 since the edge of the opening in the outer cup will abut the shoulder on the pins. With the parts in this arrangement the line is free to uncoil around the smooth circumference of the outer cup as it pays out since the inner serrated cup 28 is telescoped in the outer cup 30. When it is desired to expose the line to the serrated cup and wind the line on to the spool 15, the handle 17 is rotated in the clockwise direction. Rotation of the handle 17 through the system of gearing described previously imparts the angular acceleration to the inner cup member 28 and in the course of bringing said cup member 28 up to speed, the angular displacement between the pins 37 on the inner cup 28 and the openings in the outer cup is effected, said displacement permitting the outer cup 30 to be urged to the extreme outer position by the spring and thereby expose the serrated cup to the line. The angular displacement is due to the tendency of the outer cup 30 to remain stationary during the initial rotary period of the inner cup, that is the inertia of the outer cup is sufficient to counteract the friction induced by the spring load between the outer face portion of the outer cup bearing on the shoulder portion of the pins.

Another cam pin embodiment is shown in FIGS. 16, 17 and 18. The cam pins 41, 41 of this embodiment are very similar to the above described pins except that there are no tapered portions on their inner ends. The angular displacement of the outer cup with respect to the inner cup upon actuation of the control bar is effected by a torque spring 42 circumscribed about the shaft intermediate the cup members. The torque spring 42 exerts a negligible axial force between the cup members and normally urges the outer cup 30 in a counterclockwise direction with respect to the inner cup as viewed from the front of the reel. This angular urging action upon axial displacement of the outer cup 30 in the rearward direction will cause the outer cup to rotate upon reaching the shoulder as indicated at 43 on the pins and lodge behind said shoulder. Release of the outer cup 30 is effected by actuation of the handle which in turn accelerates the inner cup. The inertia of the outer cup 30 upon angular rotation of the inner cup 28 will be sufficient to overcome the spiralling action of the spring 42 and the outer cup can move to its outer position. While the outer cup is in the extreme outer position or when the parts of the reel are arranged for winding in the line the outer portion of the pins protrude through the openings in the outer cup and cause rotation of said outer cup with the inner cup.

A further feature of the present invention is the provision of dual drag means, one operable to snub and control the line during casting, the other operable to control the amount of drag on the line while playing a fish. With regard to the former, a line clamp ring 44 of rubber or other suitable friction creating material is mounted in an annular recess in the front face of the supporting frame. The outer cup 30 is adapted to engage the ring upon axial actuation of the cup by the control bar and snub the line between said edge and annular ring surface 44.

With respect to the latter drag device, the spool as mentioned previously, is to be regarded as stationary with respect to normal operation of the reel. However, under certain circumstances the spool 15 may turn with respect to the hub 25a to provide a drag. The drag adjusting assembly acts to impart a definite and adjustable resistance against the outflow of the fishing line when the parts of the reel are in the position for winding in the line. This adjustable drag permits the spool 15 to rotate about the hub 25a and pay out the line should the lure strike an obstruction or if the lure is struck by a heavy fish. Magnitude of the drag can be adjusted and selected according to the breaking strength of the line so as to release the spool for rotation before the line is broken. The drag mechanism comprises a drag pin 45, a drag cushion 46 or suitable resilient device and a drag button 47 which may be mounted as in the present embodiment in a tubular recess in the upper portion of the supporting frame 12. The three elements are secured in the recess by means of a drag latch 48 in engagement with the drag button 47. The drag pin 45 protrudes beyond the opening in the housing adjacent the recess and is adapted to engage a friction surface on the spool which may be an annular ring of ribbed projections 49 formed on the rear flange of the spool. The drag pin assembly 45 is urged into varying degrees of pressure applying relation by means of a cam assembly mounted on a dial plate 50 in the rear portion of the supporting frame. The assembly consists of a plate 51 having a cam surface 51a formed on the periphery of the inner face and having a keyed opening 52 at its center. A pin 53 mounts a pointer 54 on the upper face of a dial plate which is fixedly secured to the supporting frame, said pin extending through the dial plate and mounting the cam 51 on the lower face of the dial plate. The cam mounted in this fashion is adapted to be moved by turning the pointer 54 from the low point wherein the pressure exerted on the pin assembly is a minimum and consequently drag on the spool is a minimum to a high point on the cam wherein the pressure exerted ultimately on the spool is a maximum. A pair of stops 51b at opposite ends of the cam surface 51a are provided to limit movement of the pointer between limit positions defined by said stops.

In operation, considering the procedure followed by the fisherman, the pole will be normally held upright with a short length of line extending beyond the end at the beginning of the cast. The thumb of the casting hand has depressed the control bar 33 to its extreme outer position so that the line may be maintained at its present extension by an internal snubbing action resulting from said disposition of the control bar and the resulting pressure induced to the snubbing members. The fisherman then begins the forward stroke of the cast and at or near the top of the stroke the pressure on the control bar is released permitting the bar to assume the position shown in FIG. 8. This action releases the line and the line pays out under the inertia of the rig. There being now no obstruction to the flow of the line off the spool, it will uncoil or peel off around the outer cup member 30 encountering a resistance so negligible that very light lures may be cast accurately and to great distances. In addition the serpentine path of the line about the spool prevents the line from tangling and gives to the line a tendency to remain straight after it has paid off the spool, thereby eliminating the tendency that the line has to kink when unwinding from conventional spool type reels. To stop the flight of the lure and regulate the length of the cast, the operator actuates the control bar rearwardly to affect a snubbing action on the line. When it is desired to reel in the line again the user merely starts the usual motion of the crank which action imparts sufficient angular acceleration to the serrated cup member to cause said cup member 28 to become exposed to the line and enable the line to be reeled on to the spool. Thus it will be noted that control bar is the one and only device necessary for liberating the line for fixed spool casting and also for controlling the outflow of the line. After each cast is completed the operator merely turns the handle as he normally would to retrieve the lure and said turning results in the return of the internal parts of the reel to a position for respooling the line.

From the foregoing it will be apparent that the present invention provides a novel improvement in spinning reels wherein the control of the line during casting and retrieving is controlled by a conveniently disposed control bar and rotation of the winding handle. In addition it will be apparent that the invention provides a novel improvement in spinning reels which is of relatively

I claim:

1. In a spinning reel comprising a housing, a spool carried by the housing, a pair of telescoping cup members mounted coaxially with the spool each having a peripheral flange adapted to surround at least a substantial portion of the spool, means to cause relative rotation between the spool and the cup members, the peripheral flange of one cup member having means on the terminal edge thereof to engage and wrap a line about the spool upon relative rotation between the spool and said one cup member, means mounting said cup members for relative axial movement and for limited relative angular displacement with respect to each other between a position wherein said terminal edge of the peripheral flange of said one cup member is covered by the peripheral flange of the other cup member and a position wherein said terminal edge of said one cup member is exposed to the spool, latch means interconnecting said cup members and operable to maintain said other cup member in said position wherein the terminal edge of the peripheral flange of said one cup member is covered by the peripheral flange of said other cup member, said latch means being actuatable upon said relative angular displacement of the cup members with respect to each other to be disengaged from said other cup member, and resilient means operably connected with said other cup member normally urging said other cup member to said position wherein said terminal edge of said one cup member is exposed to the spool, said resilient means being operable upon disengagement of said latch means from said other cup member to urge said other cup member to said position wherein said terminal edge of said one cup member is exposed to the spool.

2. In a spinning reel comprising a housing, a spool carried by the housing, a pair of telescoping cup members mounted coaxially with the spool each having a peripheral flange adapted to surround at least a substantial portion of the spool, means to cause relative rotation between the spool and the cup members, the peripheral flange of one cup member having means on the terminal edge thereof to engage and wrap a line about the spool upon relative rotation between the spool and said one cup member, means mounting said cup members for relative axial movement and for limited relative angular displacement with respect to each other between a first position wherein said terminal edge of the peripheral flange of said one cup member is covered by the peripheral flange of the other cup member and a second position wherein said terminal edge of said one cup member is exposed to the spool, at least one pin carried by one of the cup members, and means defining at least one opening in the other cup member in substantial alignment with said pin and through which opening said pin projects, said pin having a shoulder at one side edge thereof and a cam surface at the other side edge thereof, said cam surface operable, upon axial movement of the cup members with respect to each other to said first position, to engage the other cup member and cause relative angular displacement of said cup members with respect to each other to a position wherein the other cup member is engaged under the shoulder of the pin.

3. Apparatus in accordance with claim 2 wherein the means mounting the cup members for relative axial movement with respect to each other includes a spring biased control lever pivotally mounted in the housing and operatively connected with said other cup member to normally urge said other cup member axially away from said one cup member.

4. In a spinning reel comprising a housing, a spool carried by said housing, inner and outer cup members telescopically mounted with respect to each other and mounted coaxially with said spool, each of said cup members having a peripheral flange adapted to surround at least a substantial portion of the spool, means to cause relative rotation between the spool and the cup members, the peripheral flange of the inner cup member having means on the terminal edge thereof to engage and wrap a line about the spool upon relative rotation between the spool and said inner cup member, the peripheral flange of the outer cup member having a smooth terminal edge thereon, an annular friction member carried by the housing, said outer cup member being mounted for axial movement between an inner limit position wherein said smooth terminal edge engages said friction member to exert a binding pressure on the line as it extends from said spool, an intermediate position wherein said smooth terminal edge is spaced from said friction member and covers the terminal edge of said inner cup member and an outer limit position wherein the terminal edge of the inner cup member is exposed by the smooth terminal edge of the outer cup member, spring means operable to normally urge said outer cup member to said outer limit position, and latch means operable to engage said outer cup member and releasably maintain said outer cup member in said intermediate position.

References Cited in the file of this patent

UNITED STATES PATENTS

| | | |
|---|---|---|
| 2,584,020 | Humphreys | Jan. 29, 1952 |
| 2,600,558 | Mauborgne | June 17, 1952 |
| 2,602,603 | Blissit | July 8, 1952 |
| 2,613,468 | Hand | Oct. 14, 1952 |
| 2,652,990 | Ferguson | Sept. 22, 1953 |
| 2,668,025 | Hull | Feb. 2, 1954 |
| 2,675,192 | Hull | Apr. 13, 1954 |
| 2,772,839 | Morton | Dec. 4, 1956 |

FOREIGN PATENTS

| | | |
|---|---|---|
| 155,380 | Great Britain | Dec. 20, 1920 |
| 183,277 | Great Britain | July 27, 1922 |
| 159,253 | Australia | Oct. 8, 1954 |
| 946,756 | Germany | Aug. 2, 1956 |
| 1,110,429 | France | Oct. 12, 1955 |